United States Patent
Wada et al.

(10) Patent No.: US 7,526,089 B2
(45) Date of Patent: Apr. 28, 2009

(54) DEVICE AND METHOD FOR CONTROLLING DIGITAL BIDIRECTIONAL COMMUNICATION

(75) Inventors: Taemi Wada, Neyagawa (JP); Toshihiko Fukuoka, Shijonawate (JP)

(73) Assignee: Panasonic Corporation, Osaka (JP)

( * ) Notice: Subject to any disclaimer, the term of this patent is extended or adjusted under 35 U.S.C. 154(b) by 769 days.

(21) Appl. No.: 10/511,135

(22) PCT Filed: Apr. 16, 2003

(86) PCT No.: PCT/JP03/04864

§ 371 (c)(1),
(2), (4) Date: Oct. 14, 2004

(87) PCT Pub. No.: WO03/088557

PCT Pub. Date: Oct. 23, 2003

(65) Prior Publication Data

US 2005/0147251 A1 Jul. 7, 2005

(30) Foreign Application Priority Data

Apr. 17, 2002 (JP) .............................. 2002-114076

(51) Int. Cl.
*G06F 21/00* (2006.01)
(52) U.S. Cl. .................. 380/239; 380/42; 380/269; 380/277; 713/160; 713/189
(58) Field of Classification Search ............... 380/42, 380/239, 255, 259–260, 269–270, 277; 713/150–151, 713/160–162, 189–190; 725/105, 111, 117
See application file for complete search history.

(56) References Cited

U.S. PATENT DOCUMENTS

| 4,791,669 | A | * | 12/1988 | Kage ........................ 380/46 |
| 5,099,517 | A | | 3/1992 | Gupta et al. |
| 5,235,644 | A | * | 8/1993 | Gupta et al. ............... 713/161 |
| 6,330,629 | B1 | | 12/2001 | Kondo et al. |
| 6,331,987 | B1 | * | 12/2001 | Beser ........................ 370/486 |

(Continued)

FOREIGN PATENT DOCUMENTS

JP          6-77954 A          3/1994

(Continued)

OTHER PUBLICATIONS

English translation of Momona et al, "Technologies and Standardization Activities in Cable TV Access Networks", Technical Report of Institute of Electronics, Information and Communication Engineers IN98-164, Feb. 15, 1999, pp. 57-64, vol. 98 No. 589.*

(Continued)

*Primary Examiner*—Gilberto Barron, Jr.
*Assistant Examiner*—Hadi Armouche
(74) *Attorney, Agent, or Firm*—McDermott Will & Emery LLP

(57) ABSTRACT

An interface block (11) converts the format of input downstream data (STRM). A CPU (12) receives the format-converted data (DIF) and realizes the MAC function. A TEK process block (13) receives TEK process data (DTEK) obtained from the data (DIF), analyzes the data structure of the TEK process data, and performs decryption processing based on a result of the analysis.

8 Claims, 14 Drawing Sheets

U.S. PATENT DOCUMENTS

| | | | |
|---|---|---|---|
| 7,174,452 B2* | 2/2007 | Carr | 713/151 |
| 2003/0061623 A1* | 3/2003 | Denney et al. | 725/125 |
| 2005/0286720 A1* | 12/2005 | Fukuoka et al. | 380/255 |
| 2006/0120400 A1* | 6/2006 | Fukuoka et al. | 370/447 |

FOREIGN PATENT DOCUMENTS

| | | | |
|---|---|---|---|
| JP | 9-212457 | | 8/1997 |
| JP | 11-220508 A | | 8/1999 |
| JP | 2003153221 A | * | 5/2003 |
| WO | WO 99/64952 | | 12/1999 |

OTHER PUBLICATIONS

Japanese Office Action, with English translation, issued in Japanese Patent Application No. JP 2002-114076, mailed Feb. 5, 2008.

Momona, M., et al., "Technologies and Standardization Activities in Cable TV Access Networks", Technical Report of Institute of Electronics, Information and Communication Engineers IN98-164, Feb. 15, 1999, pp. 57-64, vol. 98 No. 589.

Kasai, M., et al., "A High-Performance Method for IPsec Processing", Engineering Laboratory Report 2001-CSEC-12 of Institute of Electronics, Information and Communication Engineers, Feb. 21, 2001, pp. 67-72, vol. 2001 No. 15.

Data-Over-Cable Service Interface Specifications, "Radio Frequency Interface Specification SP-RFlv1-l06-001215." Cable Television Laboratories, Inc. pp. 1-258.

Data-Over-Cable Service Interface Specifications, "Baseline Privacy Plus Interface Specification SP-BPI+ -107-010829." Cable Television Laboratories, Inc. pp. 1-110.

* cited by examiner

FIG. 4

| Field | Length (bit) | Description |
|---|---|---|
| sync byte | 8 | 0x47:MPEG Packet Sync Byte |
| transport error indicator (TEI) | 1 | 0···No error in packet<br>1···Error in packet |
| payload unit start indicator (PUSI) | 1 | 0···No pointer field exists<br>1···Pointer field exists<br>*Pointer field is 5th byte of MPEG frame PUSI is set when corresponding packet includes start of payload |
| transport priority | 1 | 0(Reserved) |
| PID | 13 | 0x1FFE for DOCSIS Data-Over-Cable |
| transport scrambling control | 2 | 0(Reserved) |
| adaptation field control | 2 | 1(This field unavailable for DOCSIS PID) |
| continuity counter | 4 | Circular counter of PID |

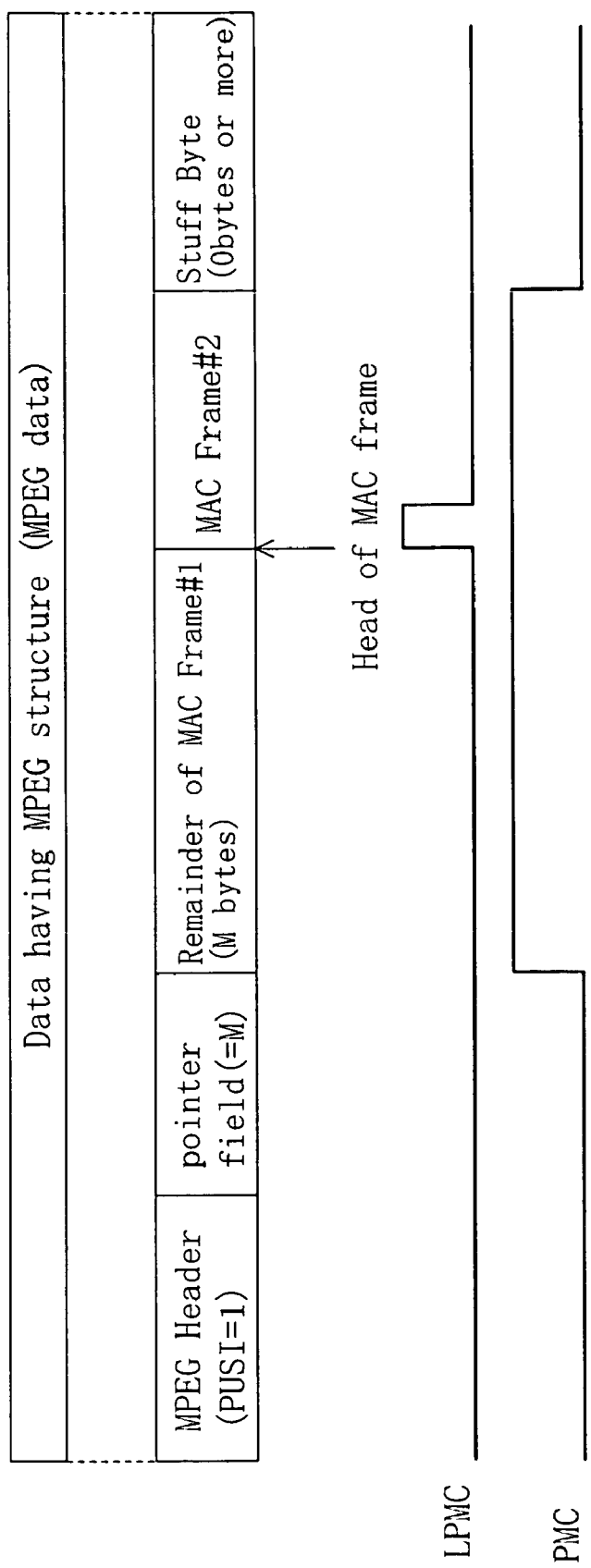

FIG. 8
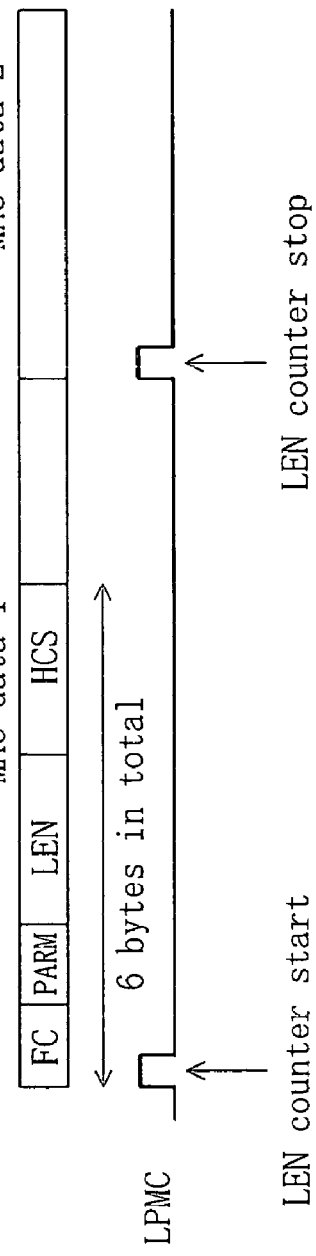
(a) Check of LEN field
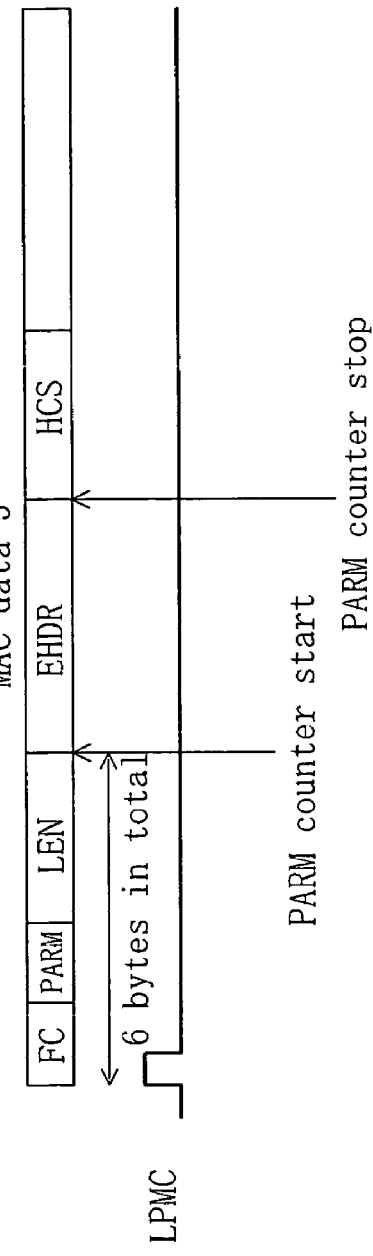
(b) Check of PARM field

DEVICE AND METHOD FOR CONTROLLING DIGITAL BIDIRECTIONAL COMMUNICATION

TECHNICAL FIELD

The present invention relates to a device for performing bidirectional control in digital bidirectional communication and specifically to a technique for optimizing a component associated with downstream communication from a center device to a terminal device.

BACKGROUND ART

A digital bidirectional communication system, typified by a bidirectional CATV system, is constructed by a bidirectional communication network wherein a plurality of terminal devices are connected to a center device. Each terminal device has a MAC (Media Access Control) function for controlling bidirectional communication which includes downstream communication from the center device to the terminal devices and upstream communication from the terminal devices to the center device. In general, the processing function is realized by encrypting a protocol which has a MAC-specific structure buried in communication data as a sub-layer.

An example of the MAC structure is DOCSIS (Data Over Cable Service Interface Specifications) system proposed by MCNS (Multimedia Cable Network Systems partners), which is the organization established by cable operators and TV-set suppliers in U.S., and is currently the defacto standard. Details of this system are disclosed in the specification, *Data-Over-Cable Service Interface Specifications*, "Radio Frequency Interface Specification SP-RFIv1.1-I06-001215", supplied by Cable Labs (Cable Television Laboratories Inc.) of U.S.

In general, video data is mainly transferred by the downstream communication. Thus, although communication data has an MPEG structure, a MAC structure is defined as a sub-layer of the communication data. In the downstream communication, the communication channel frequency is allocated to a relatively wide band, and therefore, communication control itself is relatively simple. However, it is necessary to process an enormous amount of data for video data transfer, and thus, it is required to process the data in real time according to a predetermined procedure without causing an error.

On the other hand, in the upstream communication, control data is mainly transferred in general. This control data includes an instruction request from a terminal device and state indication data which indicates the state of each terminal device. Receiving the control data transferred through the upstream communication, the center device responds to a request instruction from each terminal device or transmits various information for appropriately controlling terminal devices as control data of the downstream communication. Since in the upstream communication a large number of communication channel frequencies are allocated to a narrow band, a collision occurs among a plurality of terminal devices in some cases. In other cases, a necessary communication channel frequency cannot be obtained. For such reasons, the upstream communication requires complicated control, and the function for realizing the complicated control greatly affects the communication performance of the bidirectional communication.

The DOCSIS MAC structure basically has the same structure as that of the Ethernet communication in order to improve the compatibility with IP communication based on the Ethernet but has various header fields which are DOCSIS-specific regions. Among the header fields, a field called "extension header", which is a region having a variable length, defines the cryptographic function and other additional functions. The extension header is a feature of the DOCSIS MAC structure.

In order to realize the MAC function, it is necessary to perform various processes at appropriate timings after the data structure having a complicated multi-layered structure is analyzed as defined in the above specification. Implementing a large number of processes for an enormous number of combinations and verifying the operation for each combination are fairly arduous and entail an enormous amount of data processing.

Each of the processes that constitute the MAC function is mainly arithmetic processing for a control system. Specifically, the processes are basically filtering (dividing) of data, synchronous processing, sorting, formatting, etc., and combinations thereof. Each of these processes itself is not by any means a burdensome process.

However, the MAC function includes a security function for protecting data indispensable for the communication system. As for the DOCSIS system, the details of the specifications are disclosed in the specification, *Data-Over-Cable Service Interface Specifications*, "Baseline Privacy Plus Interface Specifications SP-BPI+-I07-010829" Supplied by Cable Labs of U.S.

The security function of the MAC function is called "Baseline Privacy", which uses a protocol called "BPKM (Baseline Privacy Key Management)". BPKM has a function for transferring an encrypted cryptographic key for achieving safe key exchange and a message authentication function for confirming whether or not a message of cryptographic key exchange is from a true sender, whether or not the message has been tampered, or the like. In BPKM, key distribution is carried out using "Authorization Key" which functions as a master key, and "DES encryption key (Traffic Encryption Key (TEK))" which is actually used for encryption and decryption of data.

A terminal device receives the Authorization Key encrypted based on the RSA public key system and decrypts the Authorization Key using a RSA public key. Then, the decrypted Authorization Key is subjected to some other processes for TEK decryption and authentication to obtain TEK data. At the final step, decryption of actual communication data is carried out using the obtained TEK data. Also in the process of decrypting a RSA cipher used for decryption of Authorization Key and the process of decrypting a DES cipher used for decryption of TEK data, mathematical computations of a plurality of pieces of 64-bit data need to be repeatedly carried out in a parallel fashion. Thus, it can be said that each process is considerably burdensome.

Such processes need to be carried out in combination in order to realize the MAC function for achieving bidirectional control in digital bidirectional communication.

Problems to be Solved

In general, the MAC function is realized using a general purpose processor (CPU). This is because the CPU flexibly deals with complicated processes and is capable of relatively readily realizing verification and function correction for establishment of system reliability.

However, a high performance CPU is indispensable for the MAC function in order to realize an enormous amount of data processing. Further, all of desired functions exceed the capacity of a single CPU, i.e., are extremely difficult to realize with a single CPU. Thus, the circuit size required for realizing all of the MAC function is considerably large, resulting in an impracticably expensive device.

In view of the above, an objective of the present invention is to provide digital bidirectional communication control wherein the burden of CPU processing is reduced, and the entire circuit size of the device is optimized.

DISCLOSURE OF INVENTION

The present invention provides a digital bidirectional communication control device for performing bidirectional control in digital bidirectional communication, comprising: an interface block for converting the format of input downstream data to generate downward data; a CPU which receives the downward data and realizes a MAC (Media Access Control) function; and a TEK process block for receiving TEK (Traffic Encryption Key) process data obtained from the downward data, analyzing a data structure of the TEK process data, and performing decryption processing based on a result of the analysis.

With this structure, among the processes for realizing the MAC function, structure analysis of TEK process data and decryption processing based on a result of the structure analysis are performed by the TEK process block that is separate from the CPU. Thus, the burden of the CPU processing is reduced, and the entire device can be constructed so as to have an optimum circuit size.

Preferably, the TEK process block of the digital bidirectional communication control device of the present invention includes: a structure analysis block for analyzing an MPEG structure included in the received TEK process data and a MAC (Media Access Control) structure buried in the MPEG structure to output MAC state information data that represents the state and meaning of MAC data having the MAC structure; a decryption block for identifying encrypted part of the TEK process data by referring to the MAC state information data, decrypting the encrypted part using TEK data for cryptanalysis, and integrating a result of the decryption with unencrypted part of the TEK process data.

Preferably, the structure analysis block of the digital bidirectional communication control device of the present invention includes: an MPEG header analysis block for analyzing an MPEG header of the MPEG structure included in the TEK process data to output a MAC data position signal which indicates the position of the MAC data and a MAC data head position signal which indicates the position of a leading byte of a MAC frame; a MAC header analysis block for receiving the MAC data position signal and the MAC data head position signal and determining the state information for fields included in the MAC header of the MAC structure except for an extension header and a MACMM (MAC Management Message) header, wherein the MAC header analysis block outputs extension header position information data which indicates the position of the extension header when the TEK process data includes the extension header, and the MAC header analysis block outputs MACMM header position information data which indicates the position of the MACMM header when the TEK process data includes the MACMM header; an extension header analysis block for receiving the extension header position information data and checking fields of the extension header to output extension header state information data which represents state information of the extension header; and a MACMM header analysis block for receiving the MACMM header position information data and checking fields of the MACMM header to output MACMM header state information data which represents state information of the MACMM header, wherein the MAC header analysis block receives the extension header state information data and the MACMM header state information data and generates the MAC state information data based on state information of the fields included in the MAC header except for the extension header and MACMM header, the state information of the extension header which is represented by the extension header state information data, and the state information of the MACMM header which is represented by the MACMM header state information data.

Preferably, the MPEG header analysis block checks a field of an MPEG header to detect the position of the MAC data and the position of a leading byte of the MAC frame and output the MAC data position signal and the MAC data head position signal.

Preferably, the MAC header analysis block performs a HCS check to detect an error in the MAC header. Preferably, the MAC header analysis block performs a check on a field which indicates the MAC data length in the MAC header; and the check is realized by referring to the MAC data head position signal to count the data length of the MAC frame and determine whether or not the MAC frame length is equal to the sum of the value of the field and a predetermined data length. Preferably, the MAC header analysis block performs a MAC frame length check and an extension header length check in addition to the HCS check, thereby detecting an error in the MAC header; and if check results of the MAC frame length check and the extension header length check are no error, the MAC header analysis block invalidates a check result of the HCS check.

Preferably, the extension header analysis block refers to the extension header position information data to check a field of the extension header and determine the data length and type of the extension header; and if the value of the field of the extension header is invalid, the extension header analysis block determines that there is an error in the extension header and outputs the determination result as the extension header state information data.

Preferably, the MACMM header analysis block refers to the MACMM header position information data to check a field of the MACMM header and determine the data length and type of the MACMM header; and if the value of the field of the MACMM header is invalid, the MACMM header analysis block determines that there is an error in the MACMM header and outputs the determination result as the MACMM header state information data.

Preferably, the decryption block of the digital bidirectional communication control device of the present invention performs the steps of: referring to the MAC state information data to identify encrypted part and unencrypted part of the TEK process data; extracting from the TEK process data TEK collation data for selecting TEK data; referring to the extracted TEK collation data to select TEK data used for decryption from a plurality of items of pre-stored TEK data; converting the encrypted part so as to have a bit width equal to a unit of decryption processing and decrypting the converted encrypted part using the selected TEK data; and integrating the decrypted data and the unencrypted part.

The present invention also provides a digital bidirectional communication control method for performing bidirectional control in digital bidirectional communication, comprising: the step of converting the format of downstream data to generate downward data; the step of receiving the downward data to realize a MAC (Media Access Control) function by a CPU; and a TEK process step of receiving TEK (Traffic Encryption Key) process data obtained from the downward data at a TEK process block to analyze a data structure of the TEK process data and performs decryption processing based on a result of the analysis.

Preferably, the TEK process step of the digital bidirectional communication control method of the present invention includes: a structure analysis step of analyzing an MPEG structure included in the TEK process data and a MAC (Media Access Control) structure buried in the MPEG structure to generate MAC state information data which represents the state and meaning of MAC data having the MAC structure; and a decryption step of referring to the MAC state information data to identify encrypted part of the TEK process data, decrypting the encrypted part using TEK data for cryptanalysis, and integrating a result of the decryption with unencrypted part of the TEK process data.

Preferably, the structure analysis step includes: an MPEG header analysis step of analyzing an MPEG header of the MPEG structure of the TEK process data to generate a MAC data position signal which indicates the position of the MAC data and a MAC data head position signal which indicates the position of a leading byte of a MAC frame; a MAC header analysis step of determining the state information for fields included in a MAC header of the MAC structure except for an extension header and a MACMM (MAC Management Message) header using the MAC data position signal and the MAC data head position signal, wherein extension header position information data which indicates the position of the extension header is generated when the TEK process data includes the extension header, and MACMM header position information data which indicates the position of the MACMM header is generated when the TEK process data includes the MACMM header; an extension header analysis step of receiving the extension header position information data and checking fields of the extension header to output extension header state information data which represents state information of the extension header; and a MACMM header analysis step of receiving the MACMM header position information data and checking fields of the MACMM header to output MACMM header state information data which represents state information of the MACMM header, wherein the MAC state information data is generated based on state information of the fields included in the MAC header except for the extension header and the MACMM header, which has been determining at the MAC header analysis step, the state information of the extension header which is represented by the extension header state information data, and the state information of the MACMM header which is represented by the MACMM header state information data.

BRIEF DESCRIPTION OF DRAWINGS

FIG. 4 shows the format of an MPEG header.

FIG. 5 shows the format of MPEG data including a pointer field.

FIG. 8 illustrates a MAC header error detection method except for HCS check.

BEST MODE FOR CARRYING OUT THE INVENTION

Hereinafter, an embodiment of the present invention is described with reference to the drawings.

Figure 1:
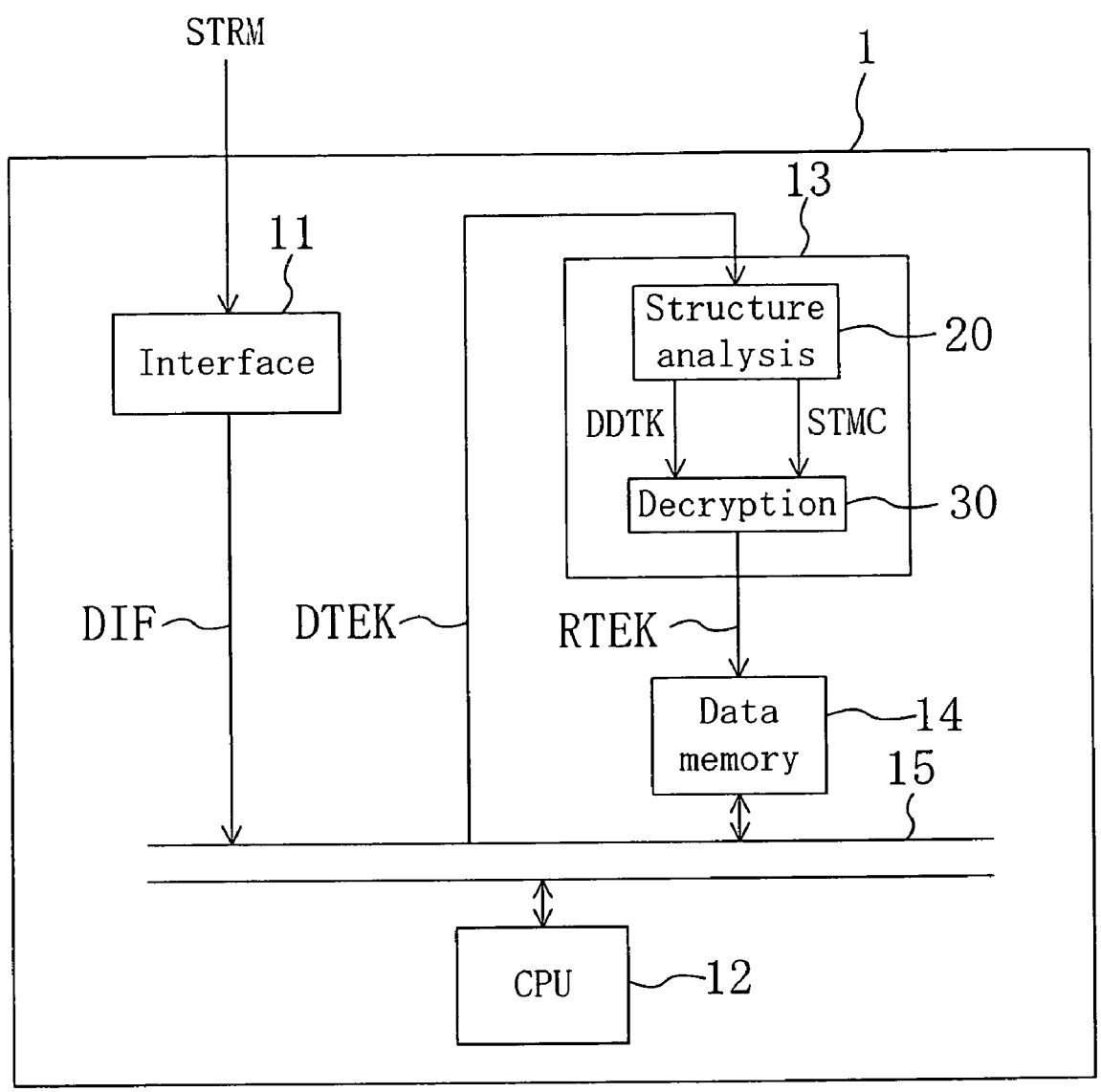
FIG. 1 is a block diagram showing a structure of a digital bidirectional communication control device according to an embodiment of the present invention.

FIG. 1 is a block diagram showing a structure of a digital bidirectional communication control device according to an embodiment of the present invention. The digital bidirectional communication control device 1 controls bidirectional communication in a bidirectional communication network including a center device and a plurality of terminal devices and is provided inside each terminal device.

In FIG. 1, reference numeral 11 denotes an interface block. The interface block 11 receives downstream data STRM which is video and transmission control data transmitted from the center device. The interface block 11 converts the format of downstream data STRM to generate CPU interface data DIF as downward data. Reference numeral 12 denotes a CPU which receives CPU interface data DIF through a CPU bus 15 and realizes a MAC (Media Access Control) function. Reference numeral 14 denotes a data memory for exchanging data with the CPU 12 through the CPU bus 15.

Reference block 13 denotes a TEK process block. The TEK process block 13 receives TEK process data DTEK which is video and transmission control data used in the TEK process. The TEK process block 13 performs data structure analysis, confirmation of the presence/absence of encryption, encryption of data, and data conversion and outputs a result of these processes as TEK process result data RTEK. The TEK process block 13 includes a structure analysis block 20 and a decryption block 30. The structure analysis block 20 performs structure analysis of TEK process data DTEK to output delayed TEK process data DDTK and MAC state information data STMC. The decryption block 30 uses delayed TEK process data DDTK and MAC state information data STMC to perform confirmation of the presence/absence of encryption in delayed TEK process data DDTK, encryption of data, and data bit conversion to output TEK process result data RTEK. TEK process result data RTEK output from the TEK process block 13 is input to the data memory 14.

Herein, MAC state information data STMC represents the state and meaning of data having a MAC structure (MAC data) which is a sub-layer for network processing. The MAC data is buried in an MPEG structure in TEK process data DTEK. Delayed TEK process data DDTK is obtained by delaying TEK process data DTEK by 0 clock or by 1 or more clocks so as to have temporal correspondence to MAC state information data STMC. CPU interface data DIF includes a control signal of the CPU bus 15 in addition to data obtained as a result of the format conversion of downstream data STRM.

FIG. 1 illustrates the operation of the digital bidirectional communication control device 1.

Receiving downstream data STRM, a terminal device transmits downstream data STRM to the interface block 11 in the digital bidirectional communication control device 1. The interface block 11 converts the format of downstream data STRM and outputs the converted data as CPU interface data DIF. The CPU 12 receives CPU interface data DIF through the CPU bus 15 and cooperates with the data memory 14 to perform various processes for realizing the MAC function. It should be noted that TEK process data DTEK which is used for the TEK process of the MAC function is transmitted from the CPU 12 to the TEK process block 13 through the CPU bus 15.

When TEK process data DTEK is input to the TEK process block 13, the structure analysis block 20 performs structure analysis on an MPEG structure in TEK process data DTEK and a MAC structure buried in the MPEG structure. Delayed TEK process data DDTK and MAC state information data STMC are output from the structure analysis block 20 to the decryption block 30. The decryption block 30 performs decryption processing on data in delayed TEK process data DDTK, which has been encrypted at the center device based on the DES (Data Encryption Standard) for protecting the confidentiality of the data, to output TEK process result data RTEK to the data memory 14. Details of the processes performed in the structure analysis block 20 and the decryption block 30 will be described later.

With such a structure, the structure analysis of TEK process data DTEK and the decryption processing based on the analysis result, which are included in the processes for realizing the MAC function, are performed by the TEK process block 13 that is separate from the CPU 12. Accordingly, the burden on the CPU processing is greatly reduced. Further, almost all of the processes performed in the TEK process block 13 are realized by repeatedly executing similar mathematical computations in a parallel fashion, and therefore, the structure of hardware is simple. Thus, the entire circuit can be structured to have an appropriate circuit size.

In the case where a path through which TEK process data DTEK is transmitted between the CPU bus 15 and the TEK process block 13 is bidirectional, a part of the TEK process can be executed by the CPU 12. Further, by directly sending video data and control data from the interface block 11 to the TEK process block 13, the occupancy of the CPU bus 15 is decreased, and the speed of the CPU processing is increased. In the case where an input path of downstream data STRM and a path through which CPU interface data DIF is transmitted from the interface block 11 to the CPU bus 15 are bidirectional, bidirectional communication control is achieved.

<Structure Analysis Block>

Figure 2:
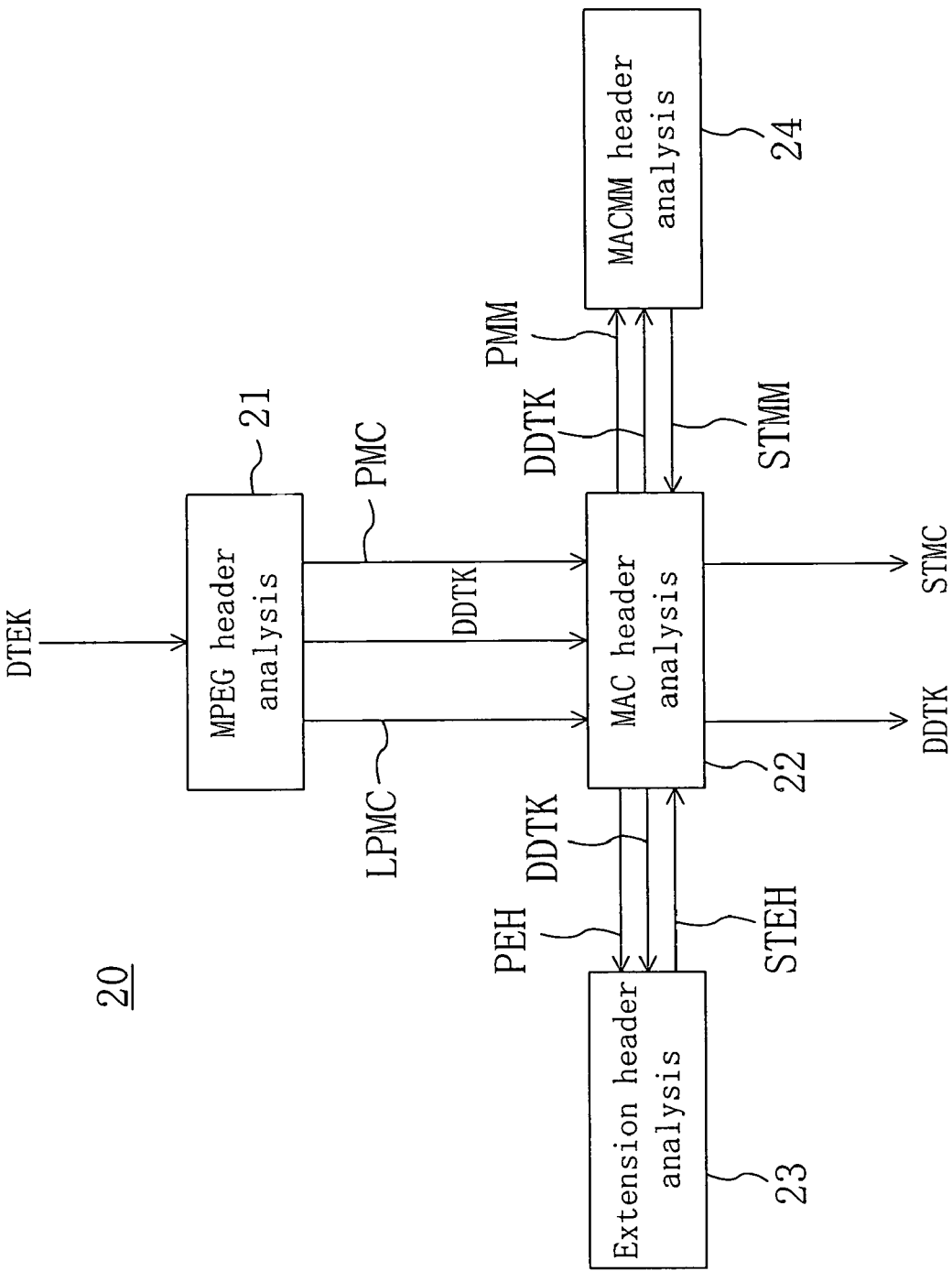
FIG. 2 shows an internal structure of a structure analysis block shown in FIG. 1.

FIG. 2 is a block diagram showing an internal structure of the structure analysis block 20 shown in FIG. 1. In FIG. 2, reference numeral 21 denotes an MPEG header analysis block. The MPEG header analysis block 21 analyzes an MPEG header (a header of the MPEG structure) in TEK process data DTEK, extracts a MAC structure from the MPEG structure, and outputs MAC data position signal PMC which indicates the data position of MAC data and MAC data head position signal LPMC which indicates the head byte position of a MAC frame. The MPEG header analysis block 21 outputs delayed TEK process data DDTK, which has been obtained by delaying TEK process data DTEK, together with MAC data position signal PMC and MAC data head position signal LPMC which are related to delayed TEK process data DDTK.

Reference numeral 22 denotes a MAC header analysis block. The MAC header analysis block 22 receives MAC data position signal PMC and MAC data head position signal LPMC and analyzes a header portion of MAC data having a MAC structure (MAC header) except for an extension header and a MACMM (MAC Management Message) header to determine the state information, i.e., the meaning of data, of each field.

If there is an extension header in delayed TEK process data DDTK, the MAC header analysis block 22 outputs extension header position information data PEH which indicates the position of the extension header. If there is a MACMM header in delayed TEK process data DDTK, the MAC header analysis block 22 outputs MACMM header position information data PMM which indicates the position of the MACMM header.

Reference numeral 23 denotes an extension header analysis block. The extension header analysis block 23 receives extension header position information data PEH and analyzes an extension header in a MAC header to output extension header state information data STEH which represents the state information, i.e., the state and meaning, of the extension header. Reference numeral 24 denotes a MACMM header analysis block. The MACMM header analysis block 24 receives MACMM header position information data PMM and analyzes a MACMM header to output MACMM header state information data STMM which represents the state information, i.e., the state and meaning, of the MACMM header.

The MAC header analysis block 22 receives extension header state information data STEH and MACMM header state information data STMM and generates MAC state information data STMC based on the state information of the fields other than the extension header and the MACMM header in the MAC header, the state information of an extension header which is represented by extension header state information data STEH, and the state information of the MACMM header which is represented by MACMM header state information data STMM.

The functions of analysis blocks 21 to 24 are described in more detail.

<MPEG Header Analysis>

The MPEG header analysis block 21 analyzes an MPEG header in TEK process data DTEK to extract a MAC structure from an MPEG structure. Specifically, the MPEG header analysis block 21 sequentially checks the fields of the MPEG header to determine the meaning of the data of each field and give a state to the data.

Figure 3:
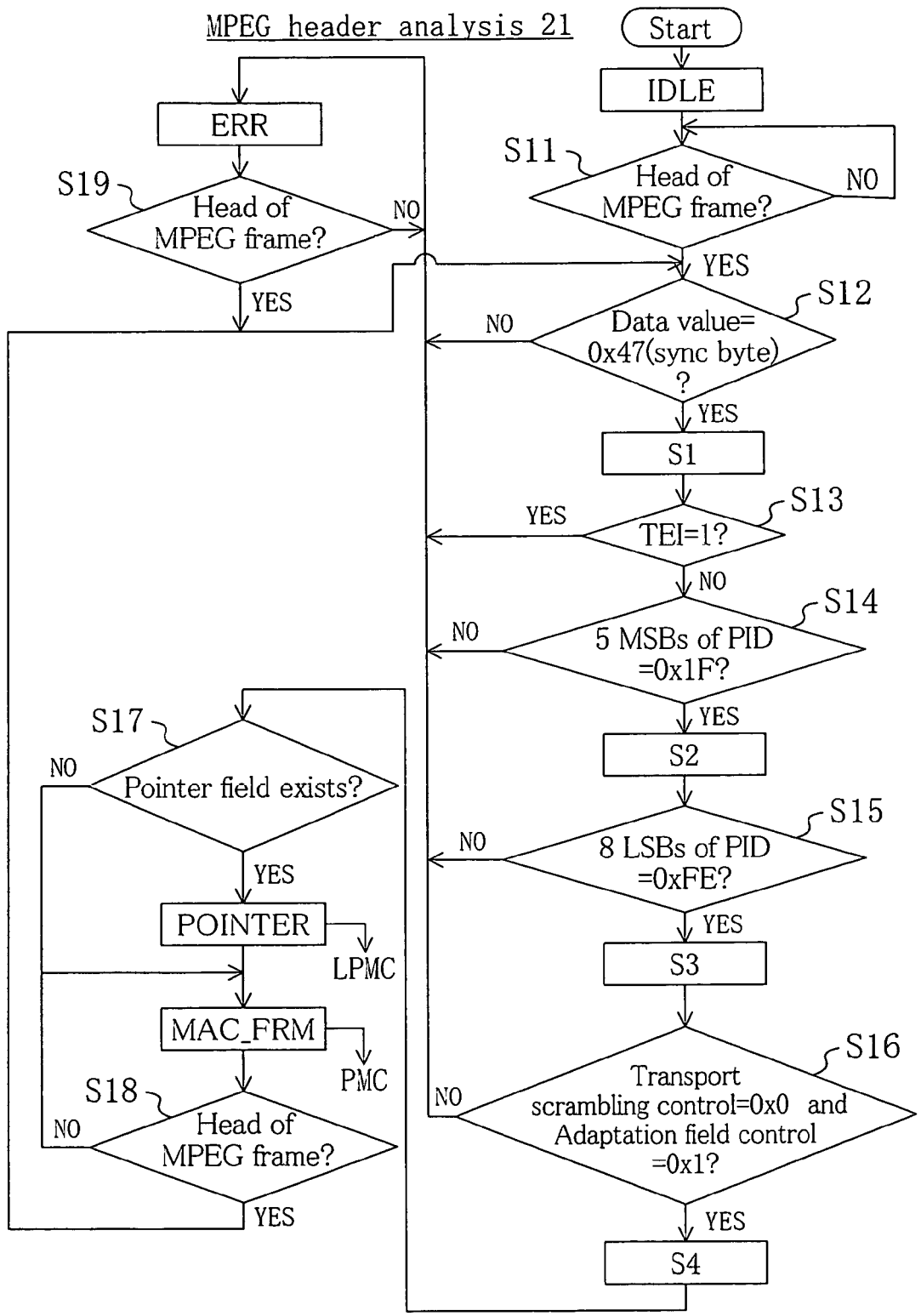
FIG. 3 shows a state machine of MPEG header analysis according to an embodiment of the present invention.

FIG. 3 illustrates a state machine of MPEG header analysis in the MPEG header analysis block 21. FIG. 4 shows the format of an MPEG header. The process flow of MPEG header analysis is described with reference to FIG. 3.

The state of the state machine transitions every byte clock. The initial state of the state is "IDLE". If there is an error in TEK process data DTEK, the state is changed to "ERR".

When the state is "IDLE", the state "IDLE" is maintained till a packet sink included in TEK process data DTEK indicates the head of a MPEG frame (S11). If the leading data of the MPEG data, i.e., the value of an MPEG packed sink byte data (sync byte) shown in FIG. 4, is "0x47" at the time when the packet sink indicates the head of a MPEG frame, the state is changed to "S1"; but if otherwise, the state is changed to "ERR" (S12).

In the case where the state is "S1", if the value of TEI (Transport Error Indicator) data shown in FIG. 4 is "0x0" (S13) and the value of the 5 most significant bits of PID (Program ID) shown in FIG. 4 is "0x1F" (S14), the state is changed to "S2". If otherwise, the state is changed to "ERR". The TEI data indicates whether or not there is an error in the MPEG structure and is attached when an error correction process is performed. The PID is set in MPEG data which transfers a MAC frame of the DOCSIS specifications.

In the case where the state is "S2", if the value of the 8 least significant bits of the PID is "0xFE", the state is changed to "S3"; but if otherwise, the state is changed to "ERR" (S15). In the case where the state is "S3", if the value of transport scramble control data (transport scrambling control) shown in FIG. 4 is "0x0" and the value of adaptation field control data (adaptation field control) shown in FIG. 4 is "0x1", the state is changed to "S4"; but if otherwise, the state is changed to "ERR" (S16). The transport scramble control data is control data related to scramble control. The adaptation field control data is control data related to allocation of fields for DOCSIS.

In the case where the state is "S4", if the value of PUSI (payload unit start indicator) shown in FIG. 4 is "0x1", it is determined that there is a pointer field, and the state is changed to "POINTER"; but if otherwise, the state is changed to "MAC_FRM" (S17). The PUSI indicates whether or not the head of MAC data exists in MPEG data. Herein, the pointer field is data important in generation of MAC data head position signal LPMC, and details thereof will be described later.

In the case where the state is "MAC_FRM", the state "MAC_FRM" is maintained till MPEG packet sink byte data emerges (S18). If the value of this data is "0x47" at the time when the MPEG packet sink byte data emerges, the state is changed to "S1"; but if otherwise, the state is changed to "ERR" (S12).

In the case where the state is "ERR", the state "ERR" is maintained till the packet sink indicates the head of MPEG data (S19). If the value of MPEG packet sink data is "0x47" at the time when the packet sink indicates the head of MPEG data, the state is changed to "S1"; but if otherwise, the state "ERR" is maintained (S12).

Herein, the pointer field and a method for generating MAC data head position signal LPMC and MAC data position signal PMC are described with reference to FIG. 5. FIG. 5 conceptually shows the format of MPEG data including a pointer field. The MPEG data as shown in FIG. 5 is included in TEK process data DTEK.

In FIG. 5, the value of the PUSI in an MPEG header is "0x1", which means that there is a pointer field. There is the pointer field subsequent to the MPEG header, and the value of the pointer field is M (M is an integer). This means that the remaining M-byte data of one MAC frame (MAC Frame #1) follows the pointer field, and a new MAC frame (MAC Frame #2) starts after the M-byte data. Thus, the leading byte position of the MAC frame can be detected based on value M of the pointer field.

Since the data whose state is "POINTER" is the pointer field, a pointer field counter is provided to start counting from a position where the state is "POINTER", i.e., from the position of the pointer field. When the count value of the pointer field counter is equal to the value of the pointer field, it is determined that the position is the leading byte position of the MAC frame. In this way, MAC data head position signal LPMC is generated.

The data has a MAC structure as long as the state is "MAC_FRM". According to this condition, MAC data position signal PMC is generated. FIG. 5 conceptually shows the relationship of MPEG data with MAC data head position signal LPMC and MAC data position signal PMC.

The state information of each field, which has been obtained herein, is stored in a register. TEK process data DTEK is delayed by 0 clock or 1 or more clocks such that TEK process data corresponds to the state information, whereby delayed TEK process data DDTK is generated.

As a protection function of the MPEG structure, an MPEG frame length counter for counting the MPEG structure data length (188 bytes) may be provided in addition to forward and backward protection counters for TEI data. With such a function, if the MPEG structure data length is not 188 although the TEI data does not indicate an error, it is determined that the MPEG structure has an error.

<MAC Header Analysis>

The MAC header analysis block 22 analyzes a MAC header included in delayed TEK process data DDTK. Specifically, the MAC header analysis block 22 sequentially checks the fields of the MAC header to determine the meaning of the data of each field and give a state to the data.

Figure 6:
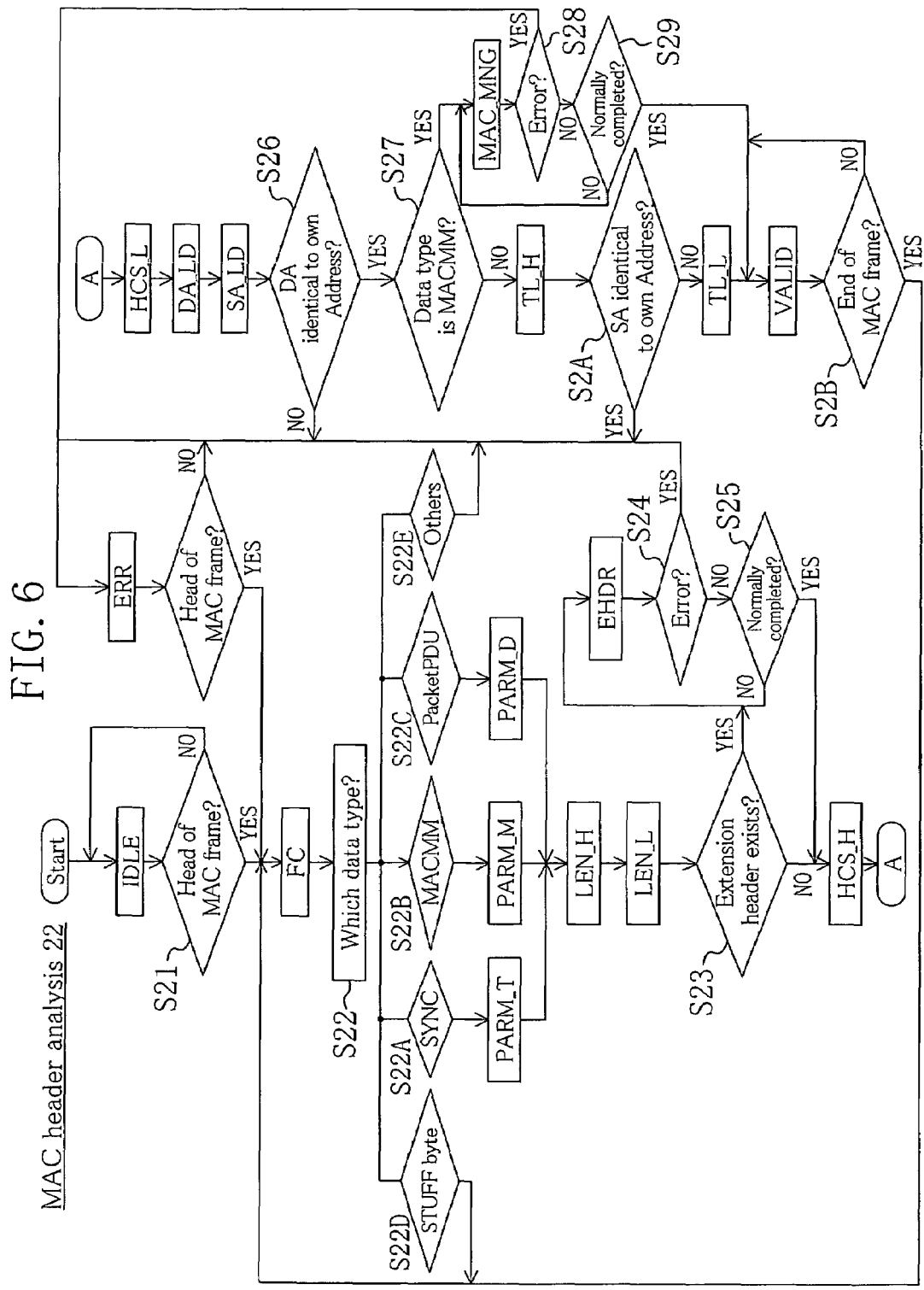
FIG. 6 shows a state machine of MAC header analysis according to an embodiment of the present invention.
Figure 7:
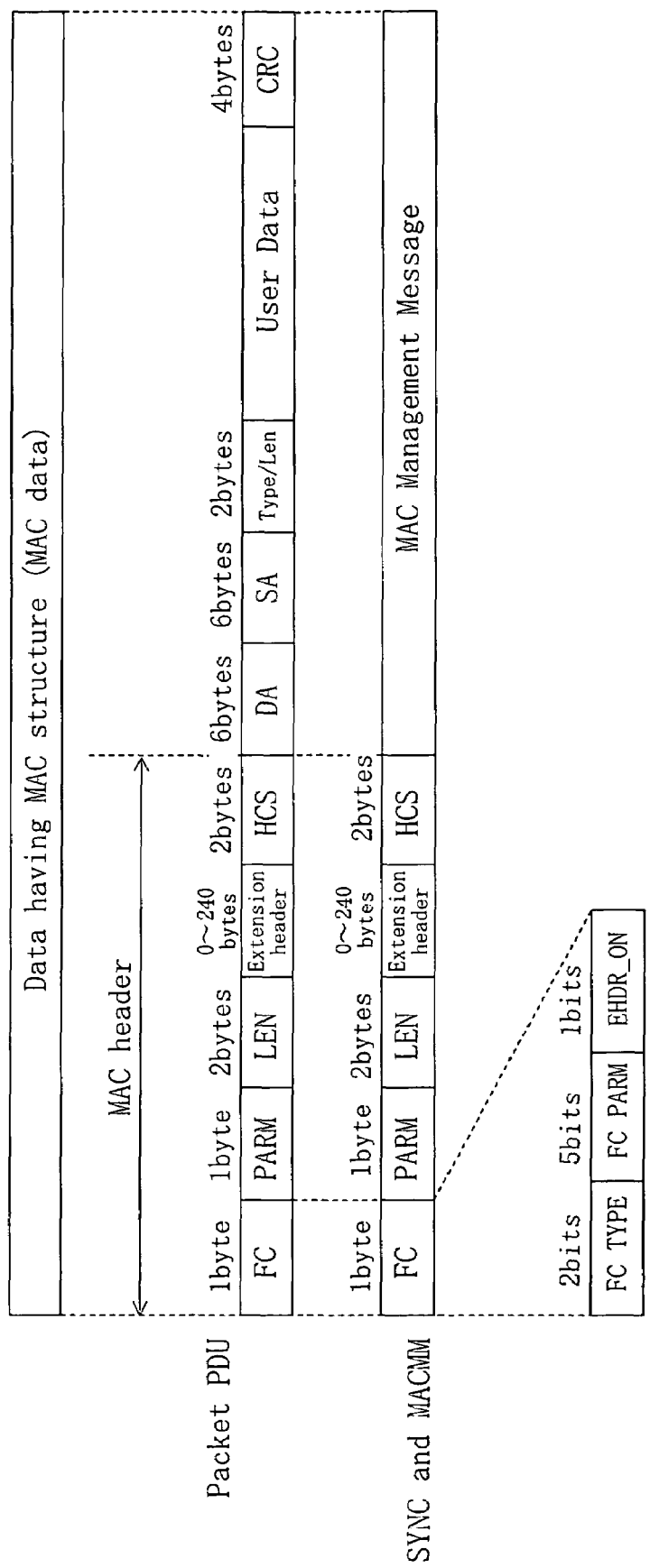
FIG. 7 shows the format of MAC data.

FIG. 6 illustrates a state machine of MAC header analysis in the MAC header analysis block 22. The state machine of MAC header analysis operates only when MAC data position signal PMC is valid. FIG. 7 shows the format of MAC data. The process flow of MAC header analysis is described with reference to FIG. 6.

The state of the state machine transitions every byte clock. The initial state of the state is "IDLE". If there is an error in the MAC structure, the state is changed to "ERR".

When the state is "IDLE", the state "IDLE" is maintained if MAC data head position signal LPMC is not valid; but if signal LPMC is valid, the state is changed to "FC" (S21). Herein, when the state is "FC", the MAC header is FC (Field Control) data which indicates the type of MAC data and whether or not there is an extension header that enables extension of the structure of MAC data.

When the state is "FC", the value of FC data is analyzed (S22). If the value of the FC data indicates SYNC data, the state is changed to "PARM_T" (S22A). If the value of the FC data indicates MACMM, the state is changed to "PARM_M" (S22B). If the value of the FC data indicates Packet PDU, the state is changed to "PARM_D" (S22C). If the value of the FC data is 0xff which indicates a STUFF byte that is a dummy data of the MPEG structure data, the state is maintained (S22D). If the FC data has any other value, the state is changed to "ERR" (S22E). The SYNC data is a MAC structure which is transmitted from the center device and is used for transferring data necessary for synchronous processing. The MACMM is a MAC structure which is transmitted from the center device and is used for transferring band allocation data used for control of MAC, data necessary for synchronous processing, etc. The Packet PDU is a MAC structure used for transferring general video data.

It is determined based on the value of EHDR_ON included in the FC data whether or not an extension header exists in MAC data. If the value of EHDR_ON is "0", no extension header exists in the MAC data. If the value of EHDR_ON is "1", an extension header exists in the MAC data.

If the state is "PARM_T", "PARM_M" or "PARM_D", the state is changed to "LEN_H". If the state is "LEN_H", the state is changed to "LEN_L". If the state is "LEN_L", it is determined based on the value of EHDR_ON whether or not an extension header exists (S23). If an extension header exists in the MAC data, the state is changed to "EHDR". If no extension header exists in the MAC data, the state is changed to "HCS_H". Since it is the position of the extension header during a period when the state is "EHDR", extension header position information data PEH is generated. Extension header position information data PEH is transmitted together with delayed TEK process data DDTK to the extension header analysis block 23. Details of the process of the extension header analysis block 23 will be described later.

When the state is "EHDR", the state is maintained during the process of the extension header analysis block 23. When it is confirmed based on extension header state information data STEH output from the extension header analysis block 23 that an extension header analysis process has been normally completed, the state is changed to "HCS_H" (S25). When it is confirmed based on extension header state information data STEH that an error exists in the extension header, i.e., that an error exists in the MAC structure, the state is changed to "ERR" (S24). Extension header state information data STEH is information which represents the state of each field of the extension header.

If the state is "HCS_H", the state is changed to "HCS_L". If the state is "HCS_L", the state is changed to "DA_LD". If the state is "DA_LD", the state is changed to "SA_LD".

When the state is "SA_LD", it is confirmed whether or not the destination address (DA) of delayed TEK process data DDTK is identical to the address of the terminal device (S26). If not identical, it is not the data to be processed by the terminal device. Thus, the state is changed to "ERR". If identical, it is determined whether or not the MAC structure is SYNC data or MACMM, i.e., whether or not a MACMM header exists in the MAC structure. If it exists, the state is changed to "MAC_MNG"; but if otherwise, the state is changed to "TL_H" (S27).

Since it is the position of the MACMM header during a period when the state is "MAC_MNG", MACMM header position information data PMM is generated. MACMM header position information data PMM is transmitted together with delayed TEK process data DDTK to the MACMM header analysis block 24. Details of the MACMM header analysis process will be described later.

In the case where the state is "MAC_MNG", the state is maintained during the process of the MACMM header analysis block 24. When it is confirmed based on MACMM header state information data STMM output from the MACMM header analysis block 24 that a MACMM header analysis process has been normally completed, the state is changed to "VALID" (S29). When it is confirmed based on MACMM header state information data STMM that an error exists in the MACMM header, i.e., that an error exists in the MAC structure, the state is changed to "ERR" (S28). MACMM header state information data STMM is information which represents the state of each field of the MACMM header.

When the state is "TL_H", it is confirmed whether or not the source address (SA) of delayed TEK process data DDTK is identical to the address of the terminal device (S2A). If identical, it is determined that the data is invalid because the destination address is identical to the source address, and the state is changed to "ERR". If not identical, the state is changed to "TL_L". If the state is "TL_L", the state is changed to "VALID".

When the state is "VALID", the state is maintained until the last data of the MAC structure. At the time of the last data of the MAC structure, the state is changed to "FC", and the structure analysis of the next MAC structure is started (S2B).

As a result of the operation according to the state, it indicates the extension header during a period when the state is "EHDR", and therefore, the MAC header analysis block 22 generates extension header position information data PEH. During a period when the state is "MAC_MNG", it indicates the MACMM header, and therefore, the MAC header analysis block 22 generates MACMM header position information data PMM. The MAC header analysis block 22 then generates MAC state information data STMC from extension header state information data STEH, MACMM header state information data STMM, and the state information of the MAC header analyzed by the MAC header analysis block 22. It should be noted that delayed TEK process data DDTK is further delayed so as to correspond to the state obtained herein, and the delayed data is output from the structure analysis block 20.

(Error Detection of MAC Header)

Herein, error detection of a MAC header is performed by HCS check. The HCS check is a method for detecting an error in a MAC header by CRC-calculating the MAC header in the structure of the MAC data shown in FIG. 7 except for HCS (FC field, PARM field, LEN field and EHDR field) and comparing a calculation result with HCS data.

FIG. 8 illustrates error detection of a MAC header except for the HCS check. In FIG. 8, part (a) illustrates check of the LEN field (MAC frame length check), and part (b) illustrates check of the PARM field (extension header length check).

As shown in part (a) of FIG. 8, a LEN counter for counting for the LEN field value is used for the check of the LEN field. The LEN counter starts counting when MAC data head position signal LPMC becomes valid at a position which indicates the head of one piece of MAC data (MAC data 1) and stops counting when MAC data head position signal LPMC becomes valid at a position which indicates the head of next MAC data (MAC data 2). As a result, the value of the LEN counter represents the data length of MAC data 1 and should be identical to the MAC_LEN length (=LEN field value+6 bytes (corresponding to FC•PARM•HCS field length)) so long as no error occurs. When the value of the LEN counter is identical to the MAC_LEN length, it is determined that there is no error in the LEN field. When the value of the LEN counter is not identical to the MAC_LEN length, it is determined that there is an error in the LEN field.

As shown in part (b) of FIG. 8, a PARM counter for counting for the PAR for the PARM field value is used for the check of the PARM field. The PARM counter starts counting at a position 6 bytes (corresponding to FC•PARM•LEN field length) later than the time when MAC data head position signal LPMC becomes valid at a position which indicates the head of one piece of MAC data (MAC data 3) and stops counting at a position where the count number corresponding to the PARM field value has been counted. As a result, the position where the PARM counter stopped counting corresponds to the end of the extension header. Thereafter, state analysis is continued according to the flowchart of FIG. 6. If the end position of the extension header which is indicated by the PARM counter is wrong, the subsequent state analysis results result in errors. Thus, if the state result is not "ERR" at the time when the state analysis of MAC data 3 is completed, it is determined that there is no error in the PARM field. If the state result is "ERR" at the time when the state analysis of MAC data 3 is completed, the result of the PARM field check is neglected.

In the case of checking the FC field, it is confirmed whether or not the process of checking the value of the FC field and the subsequent state analysis process according to the flowchart of FIG. 6 are compliant with the data type determined based on the value of the FC field. If the state result is not "ERR", it is determined that there is no error in the FC field. If the state result is "ERR", the result of the FC field check is neglected.

In the case of checking the EHDR field, if the state analysis result of the extension header analysis block 23, which will be described later, is not "ERR", it is determined that there is no error in the EHDR field. If the state analysis result is "ERR", it is determined that there is an error in the EHDR field.

It is possible to provide a function of determining that no error exists in the MAC header when an error is not detected in any of the fields as a result of checking the fields of the MAC header as described above even through the HCS check result is an error. For example, the check result of the HCS check may be invalidated when the check results of the MAC frame length check and the extension header length check are "no error".

It should be noted that error detection of the MAC header can be achieved only by the HCS check without using such an error detection method for the MAC header.

<Extension Header Analysis>

When there is an extension header in delayed TEK process data DDTK, the extension header analysis block 23 analyzes this extension header. Specifically, the extension header analysis block 23 sequentially checks the fields of the extension header to determine the meaning of the data of each field and give a state to the data.

Figure 9:
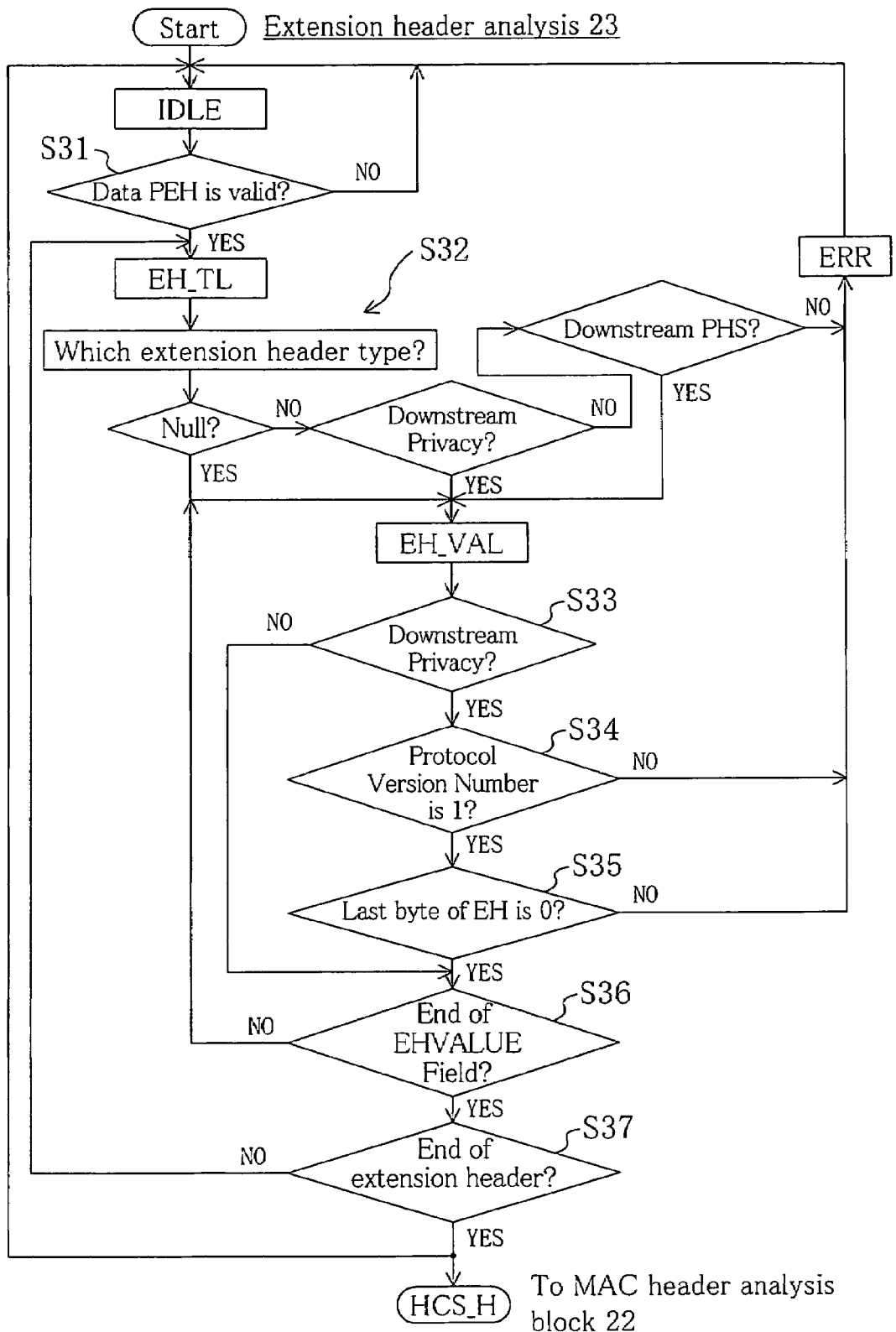
FIG. 9 shows a state machine of extension header analysis according to an embodiment of the present invention.
Figure 10:
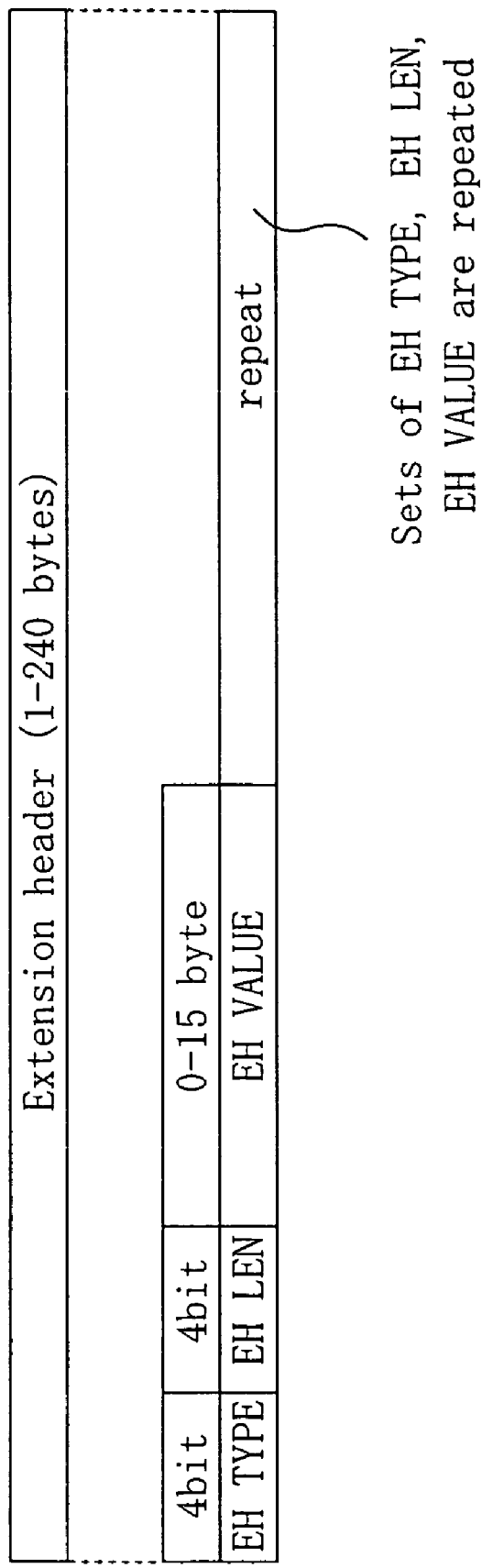
FIG. 10 shows the format of an extension header.

FIG. 9 shows a state machine of extension header analysis in the extension header analysis block 23. FIG. 10 shows the format of an extension header. As shown in FIG. 10, the extension header includes a EH TYPE field which indicates the type of the extension header, a EH VALUE field which is data part of the extension header, and a EH LEN field which indicates the length of the EH VALUE field. In the extension header, sets of the EH TYPE field, the EH VALUE field and the EH LEN field are repeated.

The process flow of extension header analysis is described according to the flowchart of FIG. 9. The state of the state machine transitions every byte clock.

In the case where the state is at the initial state "IDLE", if extension header position information data PEH transmitted from the MAC header analysis block 22 is valid, the state is changed to "EH_TL"; but if not, the initial state "IDLE" is maintained (S31).

Figure 11:
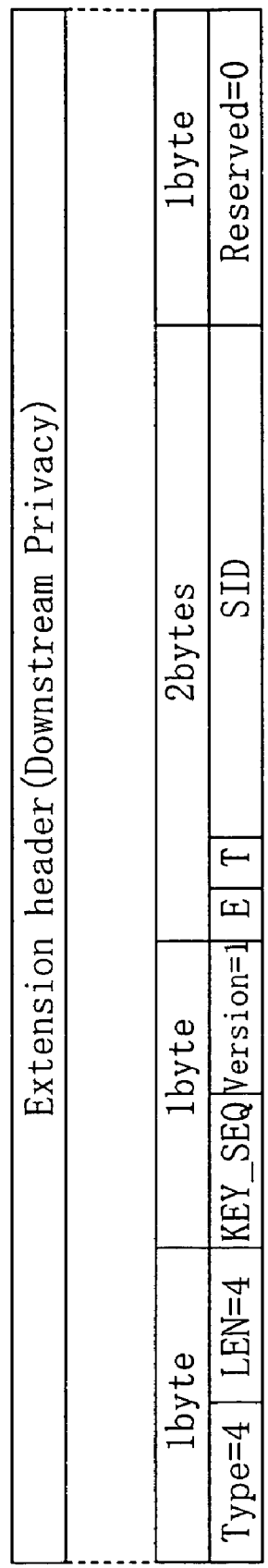
FIG. 11 shows the format of an example of an extension header (Downstream Privacy).

When the state is "EH_TL", the MAC data indicates the type and data length of the extension header. The extension header includes the following three types: "Downstream Privacy" that is data related to encryption of MAC data; "Downstream PHS" that is data which has undergone PHS (Payload Header Suppression) which is the process performed when serially-transmitted MAC data have the same headers such that the repeated headers are compressed to save the band; and "Null" that is used for fill the extension header. FIG. 11 shows the format of the extension header "Downstream Privacy".

In the case where the state is "EH_TL", if the MAD data indicates any of the above three types, the state is changed to "EH_VAL"; but if not, it is determined that there is an error in delayed TEK process data DDTK, and the state is changed to "ERR" (S32).

Now consider a case where the state is "EH_VAL" and the extension header is "Downstream Privacy" (S33). If the value of Version data (Protocol Version Number) which indicates the version of a protocol is not 0x01, or if the value of Reserved data that is the last data of the EH VALUE field is not 0x00, it is determined that there is an error in delayed TEK process data DDTK, and the state is changed to "ERR" (S34, S35).

If otherwise, it is confirmed whether or not the EH VALUE field is the end of the field (S36). This confirmation is performed by an EH LEN counter that counts the value of the EH LEN field. Specifically, when the value of the EH LEN counter is not identical to the value of the EH LEN field, the state is maintained. If identical, it is confirmed whether or not it is the end of the extension header field (S37). This confirmation is performed by referring to extension header position information data PEH. If it is the end of the extension header field, it is determined that analysis of the extension header has been normally completed, and the state is changed to "IDLE". If not, the state is changed to "EH_TL".

As a result, the extension header analysis block 23 outputs the state information of each field of the extension header, the error state information generated when it is determined that there is an error in delayed TEK process data DDTK, and the normal completion state information generated when it is determined that analysis of the extension header has been normally completed are output as extension header state information data STEH to the MAC header analysis block 22.

<MACMM Header Analysis>

When there is a MACMM header in delayed TEK process data DDTK, the MACMM header analysis block 24 analyzes this MACMM header. Specifically, the MACMM header analysis block 24 sequentially checks the fields of the MACMM header to determine the meaning of the data of each field and give a state to the data.

Figure 12:
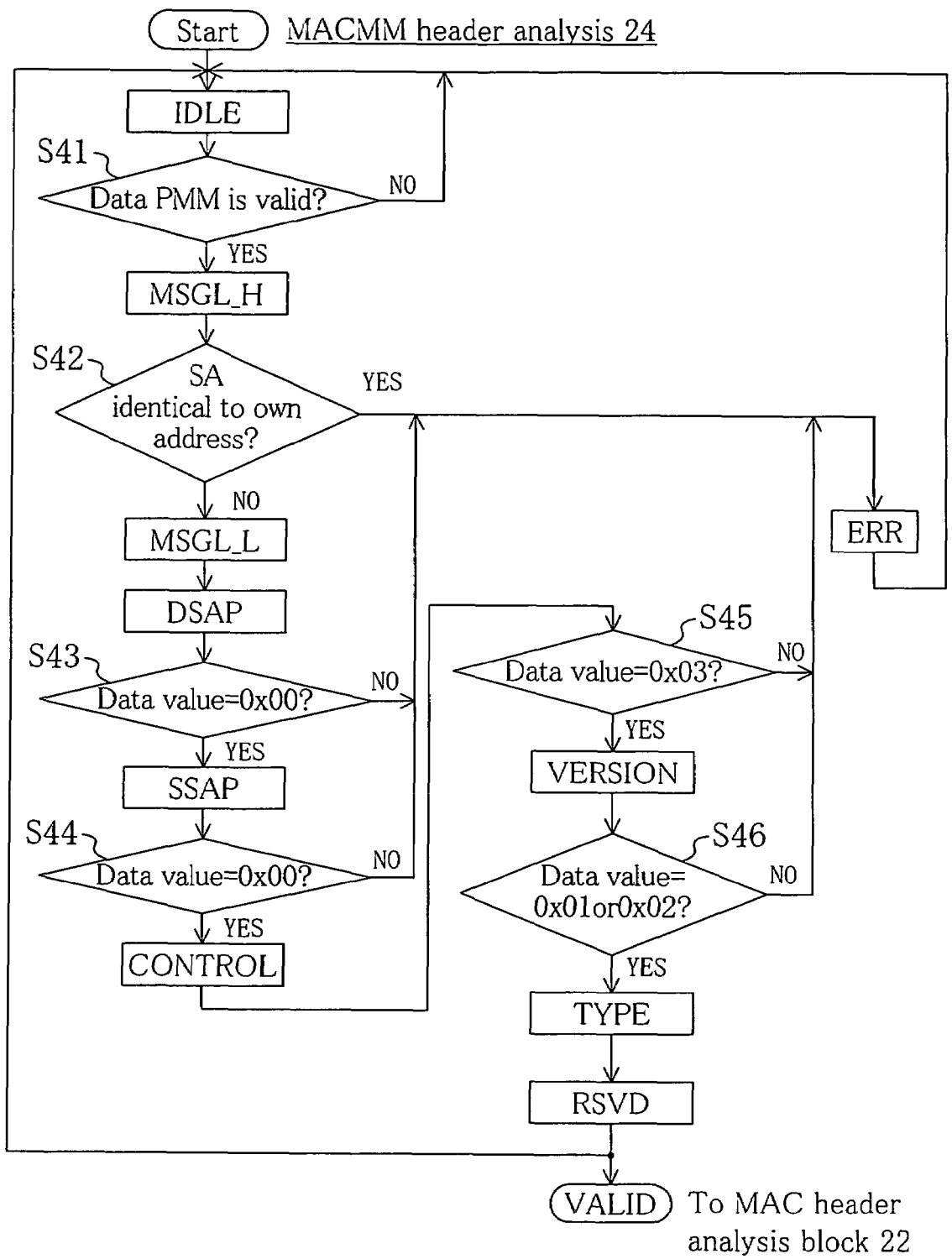
FIG. 12 shows a state machine of MACMM header analysis according to an embodiment of the present invention.
Figure 13:
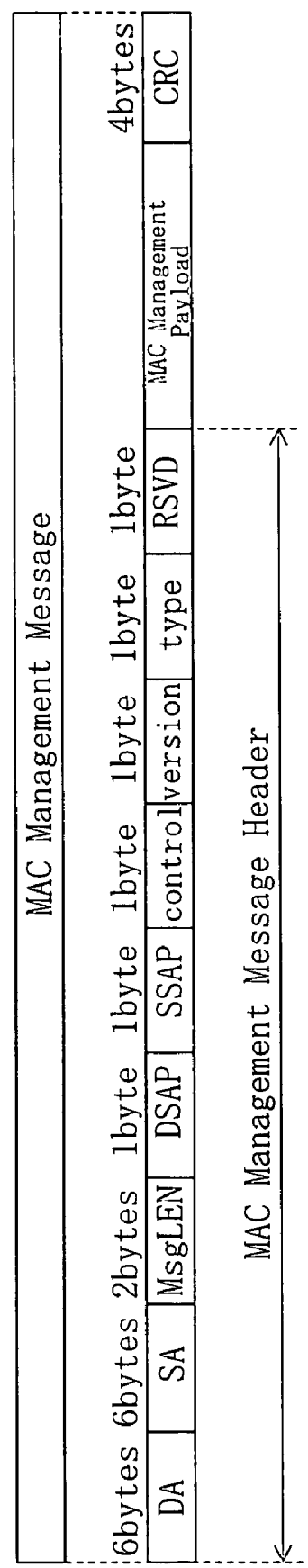
FIG. 13 shows the format of a MACMM header.

FIG. 12 shows a state machine of MACMM header analysis in the MACMM header analysis block 24. FIG. 13 shows the format of a MACMM header. In FIG. 13, "DA" is a destination address field of delayed TEK process data DDTK; "SA" is a source address field of delayed TEK process data DDTK; "MsgLEN" is a data length field of MACMM; "DSAP" is a field which indicates a LLC destination address point compliant with ISO 8802-2; "SSAP" is a field which indicates a LLC source address point compliant with ISO 8802-2; "Control" is an Unnumbered information frame field compliant with ISO 8802-3; "Version" is a field which indicates the version of MACMM; "Type" is a field which indicates the type of MACMM; "RSVD" is a reserve data field for locating a MAC Management Payload on the 32-bit border; "MAC Management Payload" is an actual data field of MACMM; and "CRC" is a check sequence data field for CRC-calculation from DA to MAC Management Payload.

The process flow of MACMM header analysis is described according to the flowchart of FIG. 12. The state of the state machine transitions every byte clock.

In the case where the state is at the initial state "IDLE", if MACMM header position information data PMM transmitted from the MAC header analysis block 22 is valid, the state is changed to "MSGL_H"; but if not, the initial state "IDLE" is maintained (S41).

When the state is "MSGL_H", the source address (SA) of received delayed TEK process data DDTK and the address of a terminal device are compared (S42). If identical, it is determined that delayed TEK process data DDTK is invalid data, and the state is changed to "ERR". If not identical, the state is changed to "MSGL_L".

When the state is "MSGL_L", the state is changed to "DSAP". In the case where the state is "DSAP", if the value of delayed TEK process data DDTK is 0x00, the state is changed to "SSAP"; but if not, it is determined that delayed TEK process data DDTK is invalid, and the state is changed to "ERR" (S43).

In the case where the state is "SSAP", if the value of delayed TEK process data DDTK is 0x00, the state is changed to "CONTROL"; but if not, it is determined that delayed TEK process data DDTK is invalid, and the state is changed to "ERR" (S44).

In the case where the state is "CONTROL", if the value of delayed TEK process data DDTK is 0x03, the state is changed to "VERSION"; but if not, it is determined that delayed TEK process data DDTK is invalid, and the state is changed to "ERR" (S45).

In the case where the state is "VERSION", if the value of delayed TEK process data DDTK is 0x01 or 0x02, the state is changed to "TYPE"; but if not, it is determined that delayed TEK process data DDTK is invalid, and the state is changed to "ERR" (S46).

In the case where the state is "TYPE", the state is changed to "RSVD". In the case where the state is "RSVD", it is determined that MACMM header analysis has been normally completed, and the state is changed to "IDLE".

As a result, the MACMM header analysis block 24 outputs the state information of each field of the MACMM header, the error state information generated when it is determined that there is an error in delayed TEK process data DDTK and the normal completion state information generated when it is determined that analysis of the MACMM header has been normally completed are output as MACMM header state information data STMM to the MAC header analysis block 22.

The process of the structure analysis block 20 is completed by the processes of the MAC header analysis block 22, the extension header analysis block 23 and the MACMM header analysis block 24. After the completion of the processes, MAC state information data STMC and delayed TEK process data DDTK corresponding thereto are transmitted to the decryption block 30.

<Decryption Block>

The decryption block 30 receives delayed TEK process data DDTK and MAC state information data STMC from the structure analysis block 20. The decryption block 30 performs decryption processing on data in delayed TEK process data DDTK, which has been encrypted at the center device based on the DES (Data Encryption Standard) for protecting the confidentiality of the data, to output the result of decryption processing as TEK process result data RTEK to the data memory 14.

Figure 14:
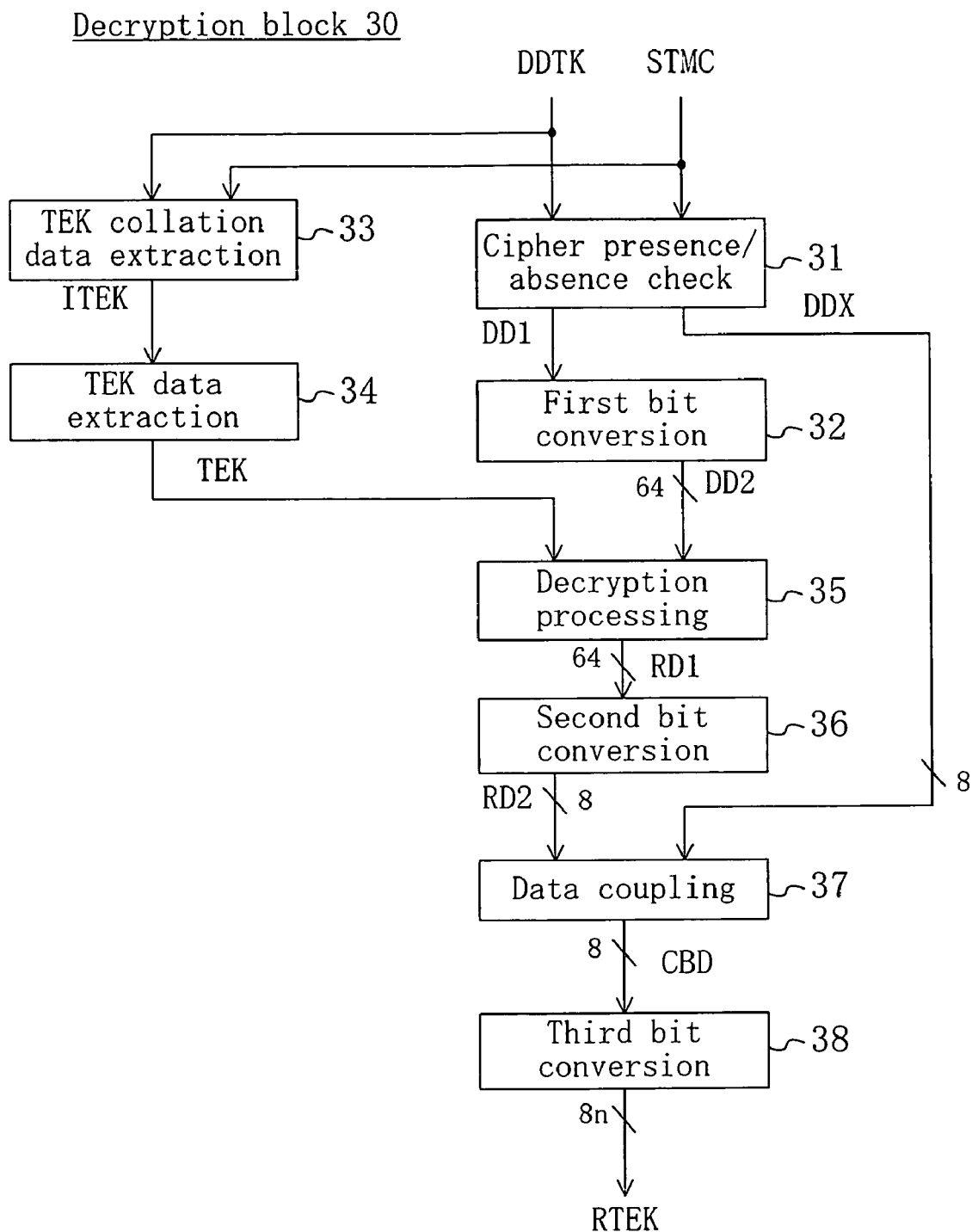
FIG. 14 is a flowchart illustrating the operation of a decryption block according to an embodiment of the present invention.

FIG. 14 is a flowchart illustrating the operation of the decryption block 30. In FIG. 14, reference numeral 31 denotes a cipher presence/absence check block. The cipher presence/absence check block 31 receives delayed TEK process data DDTK and MAC state information data STMC and determines the presence/absence of a cipher in delayed TEK process data DDTK to output first decryption subject data DD1 and decryption non-subject data DDX. Reference numeral 32 denotes a first bit conversion block. The first bit conversion block 32 converts first decryption subject data DD1 to 64-bit data whose bit width is compliant with decryption processing and outputs the resultant data as second decryption subject data DD2. Reference numeral 33 denotes a TEK collation data extraction block for extracting TEK collation data ITEK which is used for selecting TEK data TEK. Reference numeral 34 denotes a TEK data extraction block which uses TEK collation data ITEK to extract TEK data TEK. Reference numeral 35 denotes a decryption processing block for performing decryption processing on second decryption subject data DD2 to output first decryption processing result data RD1. Reference numeral 36 denotes a second bit conversion block for converting first decryption processing result data RD1 to 8-bit data whose bit width is equal to that of decryption non-subject data DDX to output the resultant data as second decryption processing result data RD2. Reference numeral 37 denotes a data coupling block for coupling second decryption processing result data RD2 and decryption non-subject data DDX to output the resultant data as coupled data CBD. Reference numeral 38 denotes a third bit conversion block for converting coupled data CBD so as to have a bit width compliant with the data memory 14 to output the converted data as TEK process result data RTEK.

Herein, first decryption subject data DD1 is a DES-encrypted part of delayed TEK process data DDTK. Decryption non-subject data DDX is a part of delayed TEK process data DDTK which is not DES-encrypted. TEK data TEK is data for cryptanalysis. Herein, TEK data TEK is specifically a DES encryption key which is actually used for encryption and decryption of data. TEK collation data ITEK is sequence data to be collated for selecting TEK data TEK which is used for decryption from a plurality of items of pre-stored TEK data. Herein, it is assumed that TEK data TEK includes initial value data for decryption processing.

Since TEK data is periodically modified for anti-cryptanalysis, a data storage buffer is provided in the TEK data extraction block 34 for storing in advance the index-sequence numbers of the previous and subsequent TEK data, the initial value data for decryption processing, and the TEK data set in an extension header of delayed TEK process data DDTK such that communication between a center device and a terminal device is not interrupted when the TEK data is updated.

Hereinafter, the process of the decryption block 30 is described according to the flowchart of FIG. 14. It is herein assumed that MAC state information data STMC includes at least a MAC data Encrypt signal which is generated from an Encrypt bit indicative of whether or not MAC data included in an extension header has been encrypted, an enable signal which indicates the positions of a MAC header and address data (SA, DA), and a TEK collation data enable signal which indicates the position of TEK collation data included in the extension header.

In the first place, in the cipher presence/absence check block 31, MAC state information data STMC is referred to identify unencrypted part and encrypted part of delayed TEK process data DDTK, and first decryption subject data DD1 and decryption non-subject data DDX are output. Specifically, in the case where the MAC data Encrypt signal indicates that the MAC data has been encrypted, the MAC header and address data included in the MAC data are output as decryption non-subject data DDX, while the other part of the MAC data is output as first decryption subject data DD1. On the other hand, in the case where the MAC data Encrypt signal does not indicate that the MAC data has been encrypted, the entire MAC data is output as decryption non-subject data DDX.

Thereafter, in the first bit conversion block 32, first decryption subject data DD1 is converted to 64-bit data (64 bits is the unit of decryption processing) and output as second decryption subject data DD2.

In the TEK collation data extraction block 33, TEK collation data ITEK is extracted from delayed TEK process data DDTK. That is, data indicated by the TEK collation data enable signal is extracted and output as TEK collation data ITEK. Then, in the TEK data extraction block 34, TEK collation data ITEK is used to extract TEK data TEK from the data storage buffer.

Thereafter, in the decryption processing block 35, decryption processing is performed using second decryption subject data DD2 and TEK data TEK, and the result of the decryption processing is output as first decryption processing result data RD1.

Then, in the second bit conversion block 36, first decryption processing result data RD1 is converted to 8-bit data whose bit width is equal to that of decryption non-subject data DDX. The result of the conversion is output as second decryption processing result data RD2. In the data coupling block 37, second decryption processing result data RD2 and decryption non-subject data DDX are integrated and output as coupled data CBD. Thereafter, in the third bit conversion block 38, coupled data CBD is converted so as to have a bit width compliant with the data memory 14, and the result of the conversion is output as TEK process result data RTEK to the data memory 14.

It should be noted that the unit of decryption processing is not limited to 64 bits, and the bit width of second decryption processing result data RD2 is not limited to 8 bits. For example, the number of bits for these values may be 8×n bits (n is an integer).

According to the present invention, as described above, in a digital bidirectional communication control device in a bidirectional communication network including a center device and a plurality of terminal devices, exclusive processing for the TEK function, which requires a larger amount of mathematical computations as compared with the other MAC functions, is executed by a TEK process block that is separate from a CPU. With such a structure, the burden on the CPU is reduced while the circuit size is optimized. As a result, the throughput is further improved, and accordingly, the cost performance of the entire device is enhanced.

The invention claimed is:

1. A device for performing bidirectional control in digital bidirectional communication, comprising:
 an interface block for converting a format of input downstream data to generate downward data;
 a CPU which receives the downward data and realizes a MAC (Media Access Control) function; and
 a TEK process block for receiving TEK (Traffic Encryption Key) process data obtained from the downward data, analyzing a data structure of the TEK process data, and performing decryption processing based on a result of the analysis,
 wherein the TEK process block includes:
  a structure analysis block for analyzing an MPEG structure included in the received TEK process data and a MAC (Media Access Control) structure buried in the MPEG structure to output MAC state information data that represents a state and meaning of MAC data having the MAC structure;
  a decryption block for identifying encrypted part of the TEK process data by referring to the MAC state information data, decrypting the encrypted part using TEK data for cryptanalysis, and integrating a result of the decryption with unencrypted part of the TEK process data,
 wherein the structure analysis block includes:
  an MPEG header analysis block for analyzing an MPEG header of the MPEG structure included in the TEK process data to output a MAC data position signal which indicates a position of the MAC data and a MAC data head position signal which indicates a position of a leading byte of a MAC frame;
  a MAC header analysis block for receiving the MAC data position signal and the MAC data head position signal and determining a state information for fields included in a MAC header of the MAC structure except for an extension header and a MACMM (MAC Management Message) header, wherein the MAC header analysis block outputs extension header position information data which indicates a position of the extension header when the TEK process data includes the extension header, and the MAC header analysis block outputs MACMM header position information data which indicates a position of the MACMM header when the TEK process data includes the MACMM header;
  an extension header analysis block for receiving the extension header position information data and checking fields of the extension header to output extension header state information data which represents state information of the extension header; and
  a MACMM header analysis block for receiving the MACMM header position information data and checking fields of the MACMM header to output MACMM header state information data which represents state information of the MACMM header,
 wherein the MAC header analysis block receives the extension header state information data and the MACMM header state information data and generates the MAC state information data based on state information of the fields included in the MAC header except for the extension header and MACMM header, the state information of the extension header which is represented by the extension header state information data, and the state information of the MACMM header which is represented by the MACMM header state information data.

2. The device of claim 1, wherein the MPEG header analysis block checks a field of an MPEG header to detect a position of the MAC data and a position of a leading byte of the MAC frame and output the MAC data position signal and the MAC data head position signal.

3. The device of claim 1, wherein the MAC header analysis block performs a HCS check to detect an error in the MAC header.

4. The device of claim 1, wherein:
 the MAC header analysis block performs a check on a field which indicates a MAC data length in the MAC header; and
 the check is realized by referring to the MAC data head position signal to count a data length of the MAC frame and determine whether or not the MAC frame length is equal to the sum of the value of the field and a predetermined data length.

5. The device of claim 1, wherein:
 the MAC header analysis block performs a MAC frame length check and an extension header length check in addition to the HCS check, thereby detecting an error in the MAC header; and
 if check results of the MAC frame length check and the extension header length check are no error, the MAC header analysis block invalidates a check result of the HCS check.

6. The device of claim 1, wherein:
 the extension header analysis block refers to the extension header position information data to check a field of the extension header and determine the data length and type of the extension header; and
 if the value of the field of the extension header is invalid, the extension header analysis block determines that there is an error in the extension header and outputs the determination result as the extension header state information data.

7. The device of claim 1, wherein:
 the MACMM header analysis block refers to the MACMM header position information data to check a field of the MACMM header and determine the data length and type of the MACMM header; and
 if the value of the field of the MACMM header is invalid, the MACMM header analysis block determines that there is an error in the MACMM header and outputs the determination result as the MACMM header state information data.

8. A method for performing bidirectional control in digital bidirectional communication, comprising:
 the step of converting a format of downstream data to generate downward data;
 the step of receiving the downward data to realize a MAC (Media Access Control) function by a CPU; and a TEK process step of receiving TEK (Traffic Encryption Key) process data obtained from the downward data at a TEK process block to analyze a data structure of the TEK process data and performs decryption processing based on a result of the analysis, wherein the TEK process step includes:

a structure analysis step of analyzing an MPEG structure included in the TEK process data and a MAC (Media Access Control) structure buried in the MPEG structure to generate MAC state information data which represents a state and meaning of MAC data having the MAC structure; and a decryption step of referring to the MAC state information data to identify encrypted part of the TEK process data, decrypting the encrypted part using TEK data for cryptanalysis, and integrating a result of the decryption with unencrypted part of the TEK process data, wherein the structure analysis step includes:

an MPEG header analysis step of analyzing an MPEG header of the MPEG structure of the TEK process data to generate a MAC data position signal which indicates a position of the MAC data and a MAC data head position signal which indicates a position of a leading byte of a MAC frame;

a MAC header analysis step of determining a state information for fields included in a MAC header of the MAC structure except for an extension header and a MACMM (MAC Management Message) header using the MAC data position signal and the MAC data head position signal, wherein extension header position information data which indicates a position of the extension header is generated when the TEK process data includes the extension header, and MACMM header position information data which indicates a position of the MACMM header is generated when the TEK process data includes the MACMM header;

an extension header analysis step of receiving the extension header position information data and checking fields of the extension header to output extension header state information data which represents state information of the extension header; and a MACMM header analysis step of receiving the MACMM header position information data and checking fields of the MACMM header to output MACMM header state information data which represents state information of the MACMM header, wherein the MAC state information data is generated based on state information of the fields included in the MAC header except for the extension header and the MACMM header, which has been determined at the MAC header analysis step, the state information of the extension header which is represented by the extension header state information data, and the state information of the MACMM header which is represented by the MACMM header state information data.

* * * * *